Feb. 5, 1957  J. F. KINKEL  2,780,101
FORCE BALANCE MEASURING DEVICE
Filed July 24, 1953  2 Sheets-Sheet 1
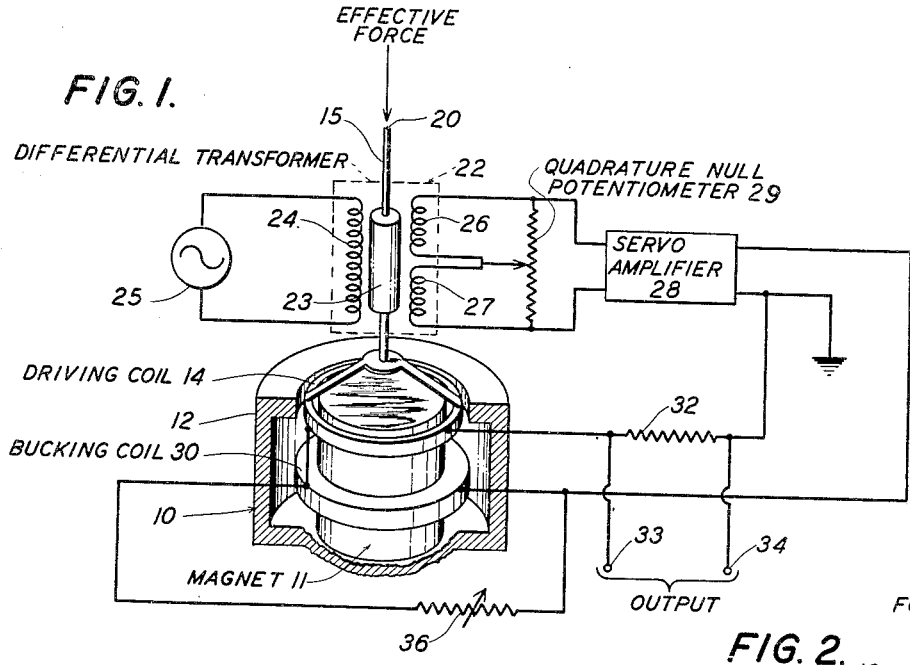
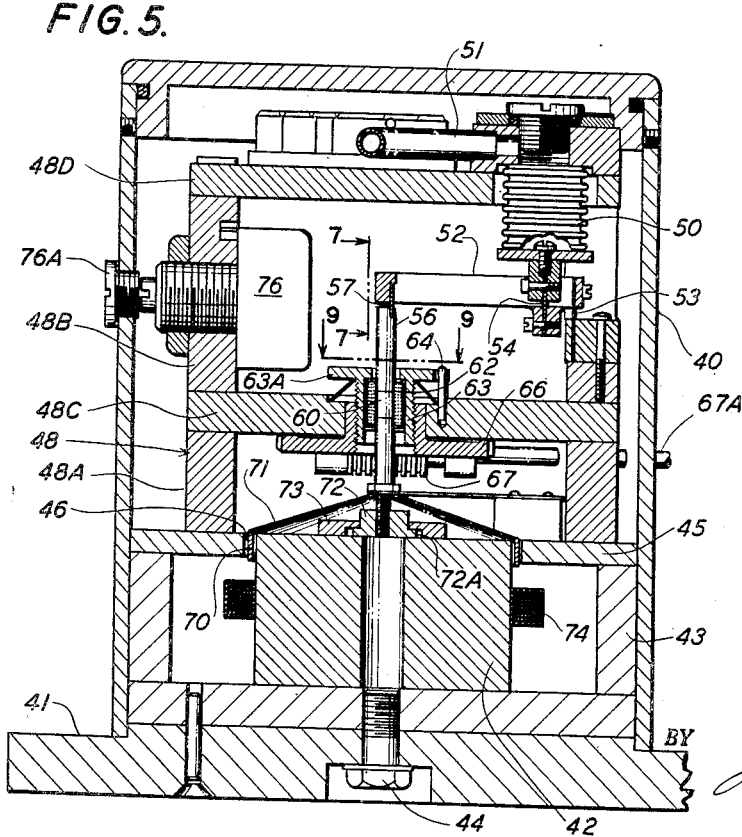
INVENTOR.
JOHN F. KINKEL
BY
James B. Christie
ATTORNEY Feb. 5, 1957 J. F. KINKEL 2,780,101
FORCE BALANCE MEASURING DEVICE
Filed July 24, 1953 2 Sheets-Sheet 2

INVENTOR.
JOHN F. KINKEL
BY
James B. Christie
ATTORNEY

United States Patent Office 2,780,101
Patented Feb. 5, 1957

2,780,101

FORCE BALANCE MEASURING DEVICE

John F. Kinkel, Altadena, Calif., assignor, by mesne assignments, to Consolidated Electrodynamics Corporation, Pasadena, Calif., a corporation of California Application July 24, 1953, Serial No. 369,997

11 Claims. (Cl. 73—398)

This invention relates to measurement of force, pressure and acceleration and specifically to a new and improved magnetic force balance adapted to such measurements. The force balance is characterized by its small, compact construction, extreme accuracy, high degree of linearity and diversified utility.

Manometer tubes have been used predominantly for precision pressure measurements because of the high degree of accuracy obtainable. However, manometer tubes have serious limitations in many applications attendant upon slow response time and an inconvenient form of output indication inherent in the monometric method of pressure measurement. The present force balance is adapted to pressure measurement with the accuracy of a laboratory manometer and, in addition, a low response time and a convenient electrical output indication, adapting it to a wide variety of uses for which a manometer is unsatisfactory. The force balance of the invention is at the same time adaptable to measurement of force, acceleration and, in general, to any parameter susceptible to presentation as a force.

A magnetic force balance is based upon the principle that the force exerted upon a conductor in a magnetic field is a function of the magnetic flux density and the electrical current in the conductor. Utilizing this principle, the conventional force balance comprises a magnet, a driving coil suspended from a displacement transducer in the magnetic field, means for applying a force which is a function of the parameter to be measured to the moving system of the transducer, and an electrical feedback loop including suitable amplification means connected between the transducer and driving coil. The feedback loop varies the current in the driving coil in opposition to the transducer output so that at equilibrium the opposing force exerted on the moving system of the transducer by the force input and driving coil are equal. An output voltage developed in an output resistor by current flow in the coil is a measure of the applied force.

Heretofore magnetic force balances have been large and cumbersome and have exhibited a disturbing degree of non-linearity. I have now developed a force balance characterized by disposition of all components save for the amplification network in a single housing with attendant size reduction and facility of use and, more importantly, increased accuracy. The disclosed instrument also embodies improved linearity compensation with the result that it exhibits a degree of linearity heretofore unobtainable in this type of instrument.

The invention contemplates a balance head for a self-balancing magnetic force balance comprising a substantially enclosed housing, a magnet mounted within the housing, a balance shaft mounted in the housing and supporting a driving coil in the field of the magnet, a differential transformer, the core of the transformer being mounted on the shaft for displacement responsive to displacement of the shaft and the primary and secondary transformer coils being independently supported around the shaft and circumscribing the core, means for applying to the shaft a force which is a function of the parameter to be measured, and a bucking coil supported on the magnet adjacent the driving coil. The bucking coil is designed to linearize the system as described in greater detail with relation to the figures.

A self-balancing magnetic force balance includes, in addition to the foregoing combination, a suitable oscillator for connection to the primary coil of the differential transformer, and a suitable amplification network connected between the secondary coils of the differential transformer and the driving coil for varying the current flow through the driving coil responsive to variations in the output of the transformer. The present invention is principally concerned with a unitary head for such a force balance and is independent of refinements and niceties of the electronic network.

The invention will be more clearly understood by reference to the following detailed description taken in conjunction with the accompanying drawings, in which:

Fig. 1 is a schematic diagram of a self-balancing magnetic force balance;

Fig. 2 is a schematic diagram illustrating one means of applying a force to the balance shaft;

Fig. 3 is a schematic diagram illustrating another means of applying a force to the balance shaft;

Fig. 4 is a schematic diagram illustrating still another means of applying a force to the balance shaft;

Fig. 5 is a vertical section of a balance head in accordance with the invention;

Figure 12:
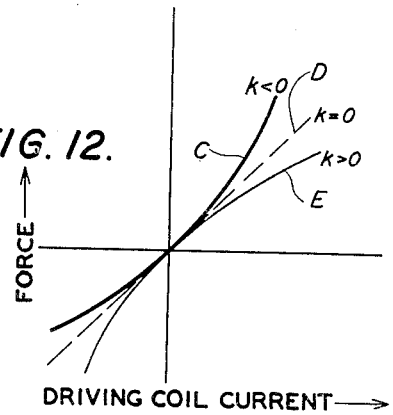
Figure 13:
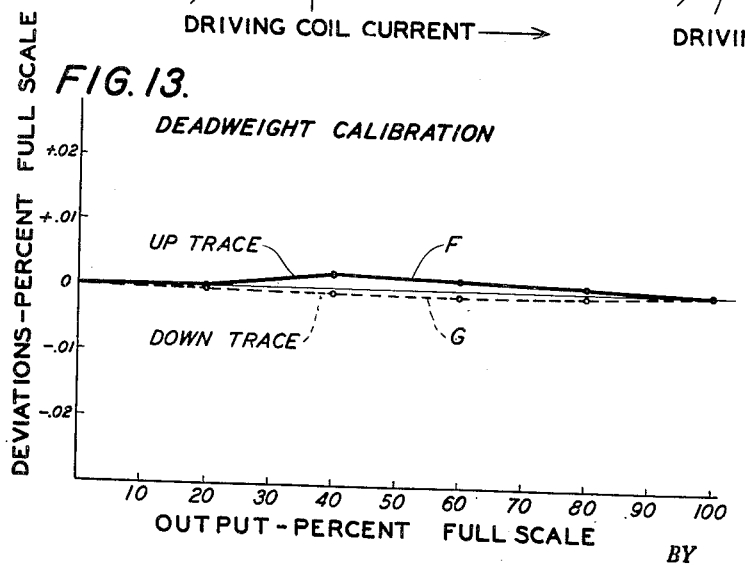

Fig. 12 is a graphic illustration of the variation of driving coil current with force variation as I have determined it to exist and upon which linearity compensation in accordance with the invention is based; and Fig. 13 is a plot of the linearity characteristics of a force balance in accordance with the invention showing the percent deviation of the output from linearity throughout the full output range.

Referring to Fig. 1, a conventional magnetic force balance comprises a magnet structure 10 including a magnet core 11 and a yoke 12 defining an air gap with the core 11. A driving coil 14 is suspended in the air gap on the end of a balance shaft 15. The effective force to be sensed is applied to the balance shaft as indicated.

The effective force to be sensed may be derived as a function of:

(1) A force;
(2) Pressure;
(3) Acceleration.

If the instrument is used to measure a force, the effective force is conveniently derived in the manner illustrated schematically in Fig. 2. In this figure, balance shaft 15 is pivotally connected to an end of a lever arm 16 which is pivotally anchored at 16A to the balance head housing. The force to be measured is applied to the lever arm intermediate its ends as at a pivotal coupling 16B whereby the functionality of the effective force to the input or applied force is determined by the leverage moments of arm 16.

If the instrument is used to measure pressure an arrangement as shown in Fig. 3 may be used. In this figure, balance shaft 15 and lever arm 16 are similarly arranged. A force summing device 17, such as a bellows or diaphragm is mechanically coupled to arm 16 at pivot point 16B. The force summing device applies a force to the arm at 16B whereby the effective force is a function of the pressure, constants of the force summing device, and leverage moments of arm 16.

If the instrument is used as an accelerometer, the arrangement shown in Fig. 4 is used. In this figure a seismic mass 18 is affixed to shaft 15. No lever arm is required.

A differential transformer 22 includes a core 23 mounted on shaft 15, a primary coil 24 connected to a suitable oscillator 25 and secondary coils 26, 27. The secondary coils of the differential transformer are connected to a servo amplifier 28, preferably through a quadrature null potentiometer 29. A bucking coil 30 is mounted on magnet core 11 and is electrically connected in the servo loop to the driving coil. The output of the servo amplifier 28 is connected across the driving and bucking coils respectively through an output resistor 32. Output terminals 33, 34 are connected across resistor 32. In a preferred embodiment of the invention a variable shunt resistor 36 is connected across the bucking coil 30.

The operation of the system illustrated in Fig. 1 is as follows: An effective force applied to shaft 15 in any of the several modes shown in Figs. 2, 3 and 4 tends to displace the shaft. Any resultant displacement of transformer core 23 develops an unbalance signal in the transformer. The unbalance signal is amplified in amplifier 28 and a resultant current is applied to driving coil 14 to resist displacement of shaft 15 to the extent necessary to retain core 23 at equilibrium position. The voltage drop across output resistor 32 being a function of the current flow in coil 14 is, at equilibrium, a measure of the effective force. This voltage drop appears at output terminals 33 and 34. The bucking coil is employed to achieve linearity in the system and is shunted through resistor 36 to permit fine adjustment of such linearity compensation. The problem of achieving the desired linearity is considered in detail with relation to Figs. 11 through 13.

A balance head in accordance with the invention, and in the specific embodiment corresponding to Fig. 3, is illustrated in sectional elevation in Fig. 5. The head comprises a housing 40 mounted on a base 41. A magnet core 42 and a yoke structure 43 are mounted to the base by a bolt 44. Yoke 43 includes an annular plate 45 and defines a restricted annular air gap 46 about magnet core 42. A supporting framework 48 is mounted on annular plate 45 within the housing and includes upright frame members 48A, 48B and longitudinally spaced transverse plates 48C, 48D supported by the upright members. A force summing device 50, in this instance a bellows, is mounted through and supported by framework plate 48D. A conduit 51, opening through a side wall of the housing, connects an external source of pressure to be measured to bellows 50.

Figure 7:
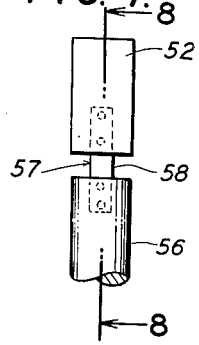
Fig. 7 is an elevation taken on the line 7—7 of Fig. 5.
Figure 8:
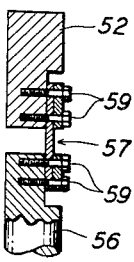
Figure 8 is a transverse section taken on the line 8—8 of Fig. 7.

A lever arm 52 is supported at one end by member 48 by means of a flexure pivot 53. Bellows 50 is mechanically linked to lever arm 52 by a second flexure pivot 54 and at a point adjacent pivot 53. A shaft 56 is depended from the inner end of lever arm 52 by a flexure pivot 57. Flexure pivot 57 is shown in elevation and transverse section, respectively, in Figs. 7 and 8, Fig. 7 being taken on the line 7—7 of Fig. 5. The pivot comprises a thin metal strip 58 fastened at opposite ends to lever arm 52 and shaft 56 by suitable screws 59 and supporting the lever arm and shaft in spaced depending relation.

Framework plate 48C is spaced above the magnet and has a central bore through which shaft 56 extends. Core 60 of a differential transformer is mounted on shaft 56 and on the portion thereof passing through plate 48C.

Figure 6:
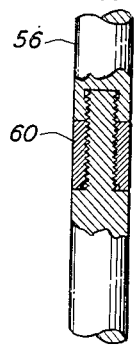
Fig. 6 is an enlarged elevation partially in section of the balance shaft showing the manner of supporting the core of the differential transformer thereon.

One means of mounting such a core on the shaft is illustrated in Fig. 6, which is an enlarged elevation partially in section of a portion of the shaft. As shown in Fig. 6, the shaft is conveniently constructed of two threadably engaged sections confining the cylindrical core 60 therebetween.

Figure 9:
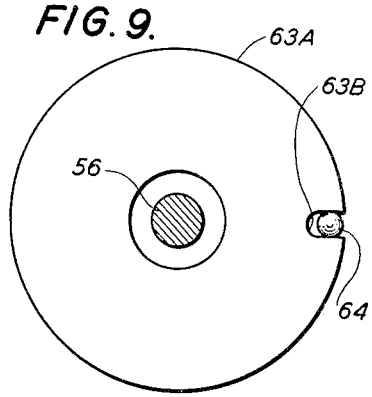
Fig. 9 is a plan view taken on the line 9—9 of Fig. 5.

Primary and secondary coils 62 of the transformer are supported about the core 60 in a cylindrical coil case 63. The coil case is provided at its upper end with an annular outwardly projecting flange 63A. The flange is shown in plan view in Fig. 9, which figure is taken on the line 9—9 of Fig. 5, and includes a radially extending notch 63B in its periphery engaging around a pin 64 supported in framework plate 48C (see Fig. 5). This arrangement permits vertical displacement of the coil case and at the same time preventing rotational displacement. A worm wheel 66 circumscribes case 63 and is threadably engaged with the case so that rotation of the worm wheel develops a vertical displacement of the case. A worm gear 67 supported from the plate 48C is connected to a shaft 67A extending through a side wall of the case, and engages the periphery of the worm wheel 66. Rotation of the worm shaft by external manipulation produces through worm wheel 66 any desired vertical adjustment of case 63. By this means the differential transformer can be balanced under static conditions.

Figure 10:
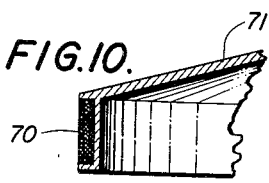
Fig. 10 is an enlarged transverse section showing the manner of supporting the driving coil from the balance shaft.

A driving coil 70 is supported in air gap 46 by a yoke 71 affixed to the lower end of shaft 56. Yoke 71 and the coil 70 are illustrated in enlarged partial section in Fig. 10. The lower end of shaft 56 is threaded into a lug 72 which has an annular lip 72A at its lower end. A cleat 73 is fastened to magnet core 42 and overhangs lip 72A of lug 72 and is proportioned to limit displacement of the shaft 56 to about plus or minus .005 of an inch. A bucking coil 74 is mounted on magnet core 42 and is electrically connected to driving coil 70 and the external electrical servo loop as illustrated in Fig. 1.

A quadrature null potentiometer 76 is supported on framework 48 within the housing, and is provided with adjustment means 76A externally of the housing.

The operation of the balance head illustrated in Fig. 5 is, in its general aspects, the same as described with relation of Fig. 1. However, there are many features of the illustrated head which make it superior to conventional force balances. One of the predominant features is the incorporation of all of the components of the system, save for an amplifier and oscillator within a single housing. This feature, which greatly enhances the commercial practicability as well as the inherent accuracy of the system, is made possible in part by the construction of the supporting assembly of the differential transformer as described, and whereby the transformer may be balanced externally of the housing. Similarly, incorporation of the quadrature null pot 76 avoids objectionable capacity effects of external leads, further increasing the accuracy of the system.

Referring again to Fig. 1, and by way of explanation of the function of the quadrature null pot, the unbalance signal voltage in the secondary coils of the differential transformer is in phase, or 180° out of phase with the voltage in the primary coil. There remains a residual voltage in the secondary which is 90° out of phase with the primary. The quadrature null pot, upon suitable adjustment, functions to reduce this 90° out of phase residual voltage to effective zero, so that it has no effect on the operation of the system.

As before mentioned, the conventional magnetic force balance exhibits a non-linear output, i. e. the current in the driving coil does not vary linearly with the input force. As a consequence the measurable output voltage appearing across output resistor 32 in Fig. 1 is non-linear. An explanation has heretofore been advanced for this non-linearity to the effect that the driving coil current produces de-magnetization of the magnet. Based on this explanation, a bucking coil has been prescribed having a number of turns equal to that of the driving coil and connected in series opposition thereto. According to this so-called "de-magnetization" theory, force, as a function of driving coil current, would be representable as curve A in Fig. 11, in which figure dotted line curve B represents a theoretical linear relation between force and driving coil current. I have found that this relationship is not in agreement with experimental results.

I propose, as an explanation for the non-linearity phenomenon, self-coupling of the driving coil which produces a small added force, this force having a magnitude proportional to the square of the current and a sign independent of the direction of current flow. This explanation is in excellent agreement with experimental evidence. Moreover, application of this self-coupling theory results in highly effective methods of compensation. One method for reducing the effect of self-coupling consists of providing a magnet structure that is symmetrical about the plane of the driving coil. Although this method can be expected to give reasonable compensation, it is subject to two serious disadvantages, namely the degree of compensation is not readily adjustable, and because of the required physical configuration the mass of the moving system tends to be larger and mechanical assembly more difficult.

I have now developed an improved method of compensation involving a bucking coil of specified design and which can be modified or adjusted to provide almost perfect compensation for practically any magnet and coil configuration encountered in practice. The design of the bucking coil to achieve linearity based on the self-coupling theory herein advanced may be determined mathematically. The total force developed by a magnet and coil assembly may be expressed as:

$$F = Bli - \beta(N_c - \alpha N_{bc})i^2 \quad (1)$$

where:

$F$ = force generated.
$B$ = effective flux density in region of driving coil with $i = 0$.
$l$ = effective length of driving coil in magnetic field.
$i$ = current in driving and bucking coil.
$\beta$ = constant determined by physical configuration of magnet and coil assembly.
$N_c$ = number of turns on driving coil.
$N_{bc}$ = number of turns on bucking coil, defined positive when bucking coil is connected in series opposition with driving coil.
$\alpha$ = constant dependent upon physical configuration of magnet and coil assembly.
$-\beta(N_c - \alpha N_{bc})i^2$ = the added non-linear force from self-coupling.

It is apparent from Equation 1 that the non-linearity can be made zero by allowing the bucking coil to have zero turns and providing a physical configuration such that the constant $\beta$ is zero, or, in the alternative, by allowing $\beta$ to be other than zero and determining the number of bucking coil turns in accordance with the following expression:

$$N_{bc} = \frac{1}{\alpha} N_c \quad (2)$$

As mentioned above, the first of these alternatives, namely the adjustment of the physical configuration in an attempt to achieve linearity, is impractical, so that the logical approach becomes the selection of the number of bucking coil turns in accordance with the expression of Equation 2. To illustrate more clearly the effect of self-coupling, Equation 1 may be simplified to:

$$F = Ki[1 - ki] \quad (3)$$

where:

$$K = Bl \quad (3a)$$

$$k = \frac{\beta N_c}{Bl}\left[1 - \frac{\alpha N_{bc}}{N_c}\right] \quad (3b)$$

Figure 11:
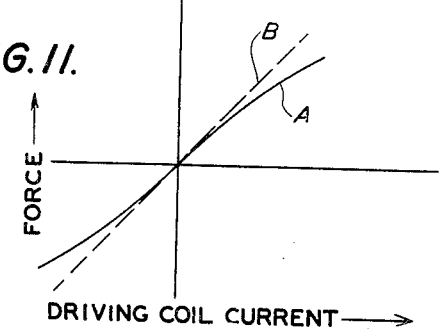
Fig. 11 is a graphic illustration of the theoretical variation in driving coil current with force variation in accordance with one theory of force balance operation.

Based on the self-coupling theory herein advanced, the relationship of force to driving coil current, i. e. the linearity of the system as effected by bucking coil design may be plotted as shown in Fig. 12 in which three curves C, D and E illustrate this relation respectively for values of $k$ as taken from Equation 3b above of less than zero, zero, and greater than zero. The lack of correspondence between curves C and E of Fig. 12 and curve A of Fig. 11 illustrates the different bases of the de-magnetization theory (graphically portrayed in Fig. 11) and the herein advanced self-coupling theory (graphically illustrated in Fig. 12).

In designing a bucking coil in accordance with the self-coupling theory there are two parameters of interest as follows:

1. The degree of non-linearity to be compensated, $k$.
2. The ratio of bucking coil turns to driving coil turns $$\left(\frac{1}{\alpha}\right)$$

to provide the required degree of compensation.

The function $\alpha$ may be evaluated either by the method of successive measurements or by adjustment of the effective number of bucking coil turns in any given instrument by means of a shunt resistor as the resistor 36 in Fig. 1. In applying the method of successive measurements, the parameters $k$ (degree of non-linearity) and $\alpha$ (constant dependent upon physical configuration of magnet and coil assembly) may be expressed as:

$$k = \frac{F_2 - \frac{i_2}{i_1}F_1}{i_2 F_2\left[\frac{i_1}{i_2} - \frac{i_2}{i_1}\frac{F_1}{F_2}\right]} \quad (4)$$

$$\alpha = \frac{k_2 - k_1}{k_2 \frac{N_{bc_1}}{N_c} - k_1 \frac{N_{bc_2}}{N_c}} \quad (5)$$

A value of $k_1$ is determined from Equation 4 with one predetermined experimental number of bucking coil turns $(N_{bc_1})$. The value $k_2$ is again evaluated from Equation 4 with a different experimental number of bucking coil turns $(N_{bc_2})$. Thereafter $\alpha$ is evaluated by Equation 5, substituting the two constants ($k_1$ and $k_2$) and the two values of bucking coil turns ($N_{bc_1}$ and $N_{bc_2}$) as above determined.

Having evaluated $\alpha$ for some particular magnet and coil configuration, either by the method of successive measurements or by trial and error adjustment of the effective number of turns of the bucking coil, the non-linearity produced by self-coupling can be reduced to virtually zero. Furthermore, since the magnitude and sign of the self-coupling non-linearity may be readily controlled, self-coupling non-linearity may be utilized for compensation of other non-linearities of the system.

In practice it is desirable to provide some convenient method of adjusting the effective ratio of bucking coil turns to driving coil turns. This effective ratio can be stated as follows:

$$\left[\frac{N_{bc}}{N_c}\right]_{\text{eff.}} = \frac{i_{bc}}{i_c}\left[\frac{N_{bc}}{N_c}\right]_{\text{actual}} \quad (6)$$

where:

$i_{bc}$ = current in bucking coil.
$i_c$ = current in driving coil.

Furthermore, as the bucking coil has a resistance $R_{bc}$ and is shunted by an external resistance $R_s$, then:

$$\frac{i_{bc}}{i_c} = \frac{R_s/R_{bc}}{R_s/R_{bc} + 1} \quad (7)$$

and $$\left[\frac{N_{bc}}{N_c}\right]_{\text{eff.}} = \frac{R_s/R_{bc}}{R_s/R_{bc} + 1}\left[\frac{N_{bc}}{N_c}\right]_{\text{actual}} \quad (8)$$

From the foregoing it is apparent that the degree of bucking coil compensation can be made continuously adjustable by providing a continuous adjustment of the bucking coil shunt resistant $R_s$ (resistor 36, Fig. 1). If suitable temperature compensation is applied, so that the ratio of bucking coil resistance $R_s/R_{bc}$, is sufficiently independent then the bucking coil shunt resistance serves as a permanent adjustment of self-coupling compensation. The consequences of the self-coupling theory herein advanced and the development of factors governing bucking coil design have been applied to the design of the force balance illustrated in Figs. 1 and 5.

To determine the effectiveness thereof, an instrument of the illustrated type was used, and the input force was applied by dead weight loading with a series of weights, each of which was equal to another within better than 1 part in 100,000. The output voltage was measured with a special precision potentiometer having a maximum deviation from linearity of .005% of full scale. The results of this test are plotted in Fig. 13 as deviation in percent of full scale as a function of percent full scale output. In the figure, solid line trace F represents the performance of the instrument in going from zero to 100% full scale, and dotted line trace G the return trace from 100% full scale to zero.

I have further determined that by practice of the invention, deviations from linearity can, by proper adjustment of the bucking coil shunt resistance, be made predominantly positive or negative as indicated in Fig. 12. Thus, a predetermined degree of non-linearity may be induced for special purposes.

The term "bucking coil," as used in the description and claims, relates to a coil which carries current in an opposite direction about the magnet core with respect to the direction of current flow in the driving coil.

I claim:

1. A self-balancing magnetic force balance comprising a housing, a magnet mounted within the housing, means for applying a force to be measured comprising, a balance shaft mounted in the housing and supporting a driving coil in circumscribing relation with the magnet, a differential transformer coupled to the shaft for providing an electric signal proportional to displacement of the shaft, a bucking coil located on the magnet adjacent the driving coil and electrically connected in series with the driving coil, means coupling the differential transformer to the serially-connected coils for conducting an electric current proportional to the electric signal through the serially-connected coils to produce a rebalance force, the number of turns on the bucking coil being selected to cause said balance force produced by the driving coil to vary substantially linearly with respect to the electric current, and means for determining the electric current.

2. A self-balancing magnetic force balance comprising a substantially enclosed housing, a magnet mounted within the housing, a balance shaft mounted in the housing and supporting a driving coil in circumscribing relation with the magnet, a seismic mass mounted on the shaft, a differential transformer coupled to the shaft for providing an electric signal proportional to displacement of the shaft, a bucking coil located on the magnet adjacent the driving coil and electrically connected in series with the driving coil, means coupling the differential transformer to the serially-connected coils for conducting an electric current proportional to the electric signal through the serially-connected coils to produce a rebalance force, the number of turns on the bucking coil being selected to cause said rebalance force produced by the driving coil to vary substantially linearly with respect to the electric current, and means for determining the electric current.

3. A self-balancing magnetic force balance comprising a substantially enclosed housing, a permanent magnet mounted within the housing, a balance shaft mounted in the housing and supporting a driving coil in circumscribing relation with the magnet, a differential transformer coupled to the shaft for providing an electric signal proportional to displacement of the shaft, the differential transformer including a core mounted on the shaft and primary and secondary transformer coils supported around the shaft and circumscribing the core, means for applying an effective force on the shaft in the direction of its longitudinal axis and as a function of the force to be measured, a bucking coil located on the magnet adjacent the driving coil and electrically connected in series with the driving coil, means coupling the differential transformer to the serially-connected coils for conducting an electric current proportional to the electric signal through the serially-connected coils to produce a rebalance force, the number of turns on the bucking coil being selected to cause said rebalance force produced by the driving coil to vary substantially linearly with respect to the electric current, and means for determining the electric current.

4. A self-balancing magnetic force balance comprising a substantially enclosed housing, a magnet mounted within the housing, a balance shaft mounted in the housing and supporting a driving coil in circumscribing relation with the magnet, a differential transformer for providing an electric signal in response to shaft displacement and including a core mounted on the shaft and primary and secondary transformer coils adjustably supported around the shaft and circumscribing the core, means operable externally of the housing to adjust the position of the primary and secondary coils longitudinally of the shaft for balancing the differential transformer so that the electrical signal it produces is proportional to longitudinal displacement of the shaft, a bucking coil located on the magnet adjacent the driving coil and electrically connected in series with the driving coil, means coupling the differential transformer to the serially-connected coils for conducting an electric current proportional to the electric signal through the serially-connected coils to produce a rebalance force, the number of turns on the bucking coil being selected to cause said rebalance force produced by the driving coil to vary substantially linearly with respect to the electric current, and means for determining the electric current.

5. A self-balancing magnetic force balance, comprising a substantially enclosed housing, a magnet mounted within the housing, means for applying a force to be measured comprising a balance shaft mounted in the housing and supporting a driving coil in circumscribing relation with the magnet, a differential transformer for providing an electric signal proportional to longitudinal displacement of the shaft and including a core mounted on the shaft and primary and secondary transformer coils adjustably supported around the shaft and circumscribing the core with a quadrature null potentiometer connected across the secondary coils, a bucking coil located on the magnet adjacent the driving coil and electrically connected in series with the driving coil, means coupling the differential transformer to the serially-connected coils for conducting an electric current proportional to the electric signal through the serially-connected coils to produce a rebalance force, the number of turns on the bucking coil being selected to cause said rebalance force produced by the driving coil to vary substantially linearly with respect to the electric current, and means for determining the electric current.

6. A self-balancing magnetic force balance comprising a substantially enclosed housing, a permanent magnet mounted within the housing, a lever arm pivotally supported in the housing, a balance shaft pivotally depending from the lever arm and supporting a driving coil in circumscribing relation with the magnet, a differential transformer for providing an electric signal proportional to shaft displacement and including a core mounted on the shaft and primary and secondary coils adjustably supported around the shaft and circumscribing the core, means operable for applying to the lever arm a force to be measured which force causes a displacement of the shaft, a bucking coil located on the magnet adjacent the driving coil and electrically connected in series with the driving coil, and means coupling the differential transformer to the serially-connected coils for conducting an electric current proportional to the electric signal through the serially-connected coils to produce a rebalance force, the number of turns on the bucking coil being selected to cause said rebalance force produced by the driving coil to vary substantially linearly with respect to the electric current, and means for determining the electric current.

7. A self-balancing magnetic force balance comprising a substantially enclosed housing, a permanent magnet mounted within the housing, a lever arm pivotally mounted in the housing, a balance shaft pivotally depending from the lever arm and supporting a driving coil in circumscribing relation with the magnet, a force summing device pivotally connected to the lever arm, means communicating through a wall of the housing to apply a pressure to be measured to the force summing device, a differential transformer for providing an electric signal proportional to displacement of the balance shaft and including a core mounted on the shaft and primary and secondary transformer coils adjustably supported around the shaft and circumscribing the core, a bucking coil located on the magnet adjacent the driving coil and electrically connected in series with the driving coil, means coupling the differential transformer to the serially-connected coils for conducting an electric current proportional to the electric signal through the serially-connected coils to produce a rebalance force, the number of turns on the bucking coil being selected to cause said rebalance force produced by the driving coil to vary substantially linearly with respect to the electric current, and means for determining the electric current as an indication of the pressure being measured.

8. A self-balancing magnetic force balance, comprising a substantially enclosed housing, a magnet mounted within the housing, means for applying a force to be measured comprising a balance shaft mounted in the housing and supporting a driving coil in circumscribing relation with the magnet, a differential transformer for providing an electric signal proportional to shaft displacement and including a core mounted on the shaft and primary and secondary transformer coils supported around the shaft and circumscribing the core, a bucking coil located on the magnet adjacent the driving coil and electrically connected in series with the driving coil, means coupling the differential transformer to the serially-connected coils for conducting electric current proportional to the electric signal through the serially-connected coils to produce a rebalance force, the number of turns on the bucking coil being selected to cause said rebalance force produced by the driving coil to vary substantially linearly with respect to the electric current, means for adjusting the effective number of turns in the bucking coil, and means for determining the electric current.

9. In a force balance having a magnet, means for applying a force to be measured comprising a balance shaft supporting a driving coil in circumscribing relation with the magnet, means responsive to the force to be measured for providing an electric current proportional to shaft displacement through the driving coil, and means for determining the current as a function of the force to be measured, the improvement which comprises a bucking coil disposed around the magnet adjacent the driving coil, the bucking coil being electrically connected in series with the driving coil so that the current is passed serially through both coils to produce a rebalance force, and the bucking coil having $N_{bc}$ turns of wire, where $$N_{bc}=\frac{1}{\alpha}N_c$$

and where $\alpha=$ a constant dependent upon the physical configuration of the magnet and driving coil, and $N_c=$ the number of turns of wire in the driving coil.

10. In a force balance having a magnet, means for applying a force to be measured comprising a balance shaft supporting a driving coil in circumscribing relation with the magnet, means responsive to the force to be measured for providing an electric current proportional to shaft displacement through the driving coil, and means for determining the current as a function of the force to be measured, the improvement which comprises a bucking coil disposed around the magnet adjacent the driving coil, the bucking coil being electrically connected in series with the driving coil so that the current is passed serially through both coils to produce a rebalance force, and the bucking coil having $N_{bc}$ turns of wire, where $$N_{bc}=\frac{1}{\alpha}N_c$$

where $N_c=$ the number of turns of wire in the driving coil, and $$\alpha=\frac{K_2-K_1}{K_2\frac{N_{bc_1}}{N_c}-K_1\frac{N_{bc_2}}{N_c}}$$

where $K_1=$ the degree of non-linearity of the balance with a bucking coil of $N_{bc_1}$ turns, and $K_2=$ the degree of non-linearity of the balance with a bucking coil of $N_{bc_2}$ turns.

11. In a self-balancing magnetic force balance having a servo amplifier for providing a balancing current and means for determining the current as a function of the force to be measured, a balance head comprising a substantially closed housing, a permanent magnet mounted within the housing, means for applying a force to be measured comprising a balance shaft mounted in the housing and supporting a driving coil in circumscribing relation with the magnet, a differential transformer including a core mounted on the balance shaft and primary and secondary transformer windings supported around the shaft and circumscribing the core, means for coupling the primary winding of the transformer to a source of alternating current, means coupling the secondary winding of the transformer to the input of said servo amplifier, a bucking coil located on the magnet adjacent the driving coil and electrically connected in series with the driving coil, the number of turns in the bucking coil being selected to cause a rebalance force produced by the driving coil to vary substantially linearly with respect to the electric current passing through it, and means coupling the output of the servo amplifier across serially-connected driving and bucking coils to produce said rebalance force.

References Cited in the file of this patent

UNITED STATES PATENTS

| | | |
|---|---|---|
| 1,855,205 | Schur | Apr. 26, 1932 |
| 2,620,665 | Carlisle et al. | Dec. 9, 1952 |
| 2,631,027 | Payne | Mar. 10, 1953 |
| 2,641,742 | Wolfe et al. | June 9, 1953 |
| 2,686,893 | Markson | Aug. 17, 1954 |
| 2,688,253 | Markson | Sept. 7, 1954 |

FOREIGN PATENTS

| | | |
|---|---|---|
| 689,066 | Great Britain | Mar. 18, 1953 |